United States Patent
Karlsson et al.

(10) Patent No.: US 7,242,351 B2
(45) Date of Patent: Jul. 10, 2007

(54) REAL-TIME EMITTER LOCATING SYSTEM AND METHOD

(75) Inventors: Lars Karlsson, Santa Clara, CA (US); Dmitri Soloviev, Santa Clara, CA (US)

(73) Assignee: Networkfab Corporation, Santa Clara, CA (US)

( * ) Notice: Subject to any disclaimer, the term of this patent is extended or adjusted under 35 U.S.C. 154(b) by 189 days.

(21) Appl. No.: 10/785,353

(22) Filed: Feb. 24, 2004

(65) Prior Publication Data

US 2004/0164901 A1  Aug. 26, 2004

Related U.S. Application Data

(60) Provisional application No. 60/449,442, filed on Feb. 24, 2003.

(51) Int. Cl.
*G01S 5/04* (2006.01)

(52) U.S. Cl. ............... 342/449; 342/450; 342/451; 342/457

(58) Field of Classification Search ............. 342/449, 342/450, 451, 457

See application file for complete search history.

(56) References Cited

U.S. PATENT DOCUMENTS 5,343,212 A * 8/1994 Rose et al. ............. 342/424
6,249,252 B1 * 6/2001 Dupray ............. 342/450
2004/0029558 A1 * 2/2004 Liu ............. 455/456.1

* cited by examiner

*Primary Examiner*—Thomas H. Tarcza
*Assistant Examiner*—Fred H. Mull
(74) *Attorney, Agent, or Firm*—Steins & Associates, P.C.

(57) ABSTRACT

A Real-time Emitter Locating (EL) System and Method is disclosed. The system provides a technique for taking in data sets (lines of bearing) from DF receivers and characterizing those signals with their respective probabilities of error. Then using a unique method, the preferred system applies a recursive processing technique to this continuous stream of data, displaying transmitter positions with significantly less uncertainty. Furthermore, the preferred system is able to perform these functions in real-time. The system is further capable of being fully automated to reduce the processing time and reduce the necessity of human intervention. Still further, in an alternative embodiment of the present invention the system can be remotely controlled over a communications network whereby collected locating data from a single DF set, or alternatively from more than one DF sets can be combined to arrive at estimated positions for a transmitter. In this way, a far more efficient EL System can be achieved in which the emitter's position can be determined more quickly from a centralized command facility. This combination of data filtering and data collection techniques significantly reduces measurement uncertainties and enhances the accuracy of EL systems.

15 Claims, 8 Drawing Sheets

REAL-TIME EMITTER LOCATING SYSTEM AND METHOD

This application is filed within one year of, and claims priority to Provisional Application Ser. No. 60/449,442, filed Feb. 2, 2003.

BACKGROUND OF THE INVENTION

1. Field of the Invention

This invention relates generally to Emitter Locating Systems and, more specifically, to a Real-time Emitter Locating System and Method

2. Description of Related Art

Emitter Location (EL) Systems are used to locate the position of emitting radio transmitters. Presently in the industry today, finding the location of a radio transmitter involves triangulation methods using at least three radio Direction Finding (DF) "Sets". Inherently though, the DF Sets that comprise EL Systems produce uncertainties in their measurements due to several factors which will be described later. The invention of this disclosure provides a far more accurate method of operating EL Systems than is presently done today.

As mentioned, present day EL Systems are comprised of multiple radio Direction Finding (DF) Sets which can either be fixed in location, or mobile on a vehicle, ship, aircraft, etc. The invention of this disclosure especially relates to EL Systems employing at least one mobile DF Set. In fact, with the use of the technique and method of this patent, only a single mobile DF Set is required in an EL System. To understand how uncertainties in the DF Set measurements are reduced with this invention, the background of direction finding operations needs to covered.

The basic components of a DF Set are: (1) a DF antenna array; and (2) a DF receiver/processor (hereafter referred to simply as "DF receiver"). The basic components of an EL System are: (1) at least one DF Set; (2) some device to interpret the streaming Line-Of-Bearing (LOB) data sets from the DF Set; (3) some sensor device to determine the DF Set's location; and (4) some sensor device to output the DF Set's orientation relative to true North.

The major sources of measurement errors in real-world DF Sets are: (1) uncertainties from the DF antenna array due to frequency dependent variations; and (2) received signal reflections (also known as multi-path).

Typically in a DF Set, a device is attached to the output that collects, interprets, and plots the line-of-bearing (LOB) data. This device is typically a computer which then displays the LOB's on some sort of map display. The LOBs that are displayed will vary from measurement to measurement depending on the aforementioned uncertainties. Most often in the industry today though, the DF Sets simply take the collected LOB data sets and average them to produce a best guess as to the true LOB to the transmitter. But as mentioned, the resulting LOB invariably has some level of error, which translates to errors in overall determination of the transmitter's location.

Another problem with present-day DF Sets is that the calculation of the transmitter's location is done by a batch process. That is, the output is calculated by taking every single previous measurement and doing an analysis on the entire aggregate set of data. This is a slow process and cannot be done in real time with large sets of data.

The invention described in this disclosure uses an improved method and technique to collect data from one or multiple DF Sets, and then to intelligently process that data in real time so that overall measurement uncertainties are reduced. Thus the transmitter's position plotted on a map will be more accurate. It should be reiterated that with the method and technique of this invention, it is possible to determine, and continuously plot on a map, the location of a transmitter by using only a single DF Set. This fact makes this invention further unique.

In conclusion, insofar as the inventor is aware, no invention formerly developed provides this unique application of methods to significantly reduce EL system measurement uncertainties.

SUMMARY OF THE INVENTION

In light of the aforementioned problems associated with the prior devices and methods, it is an object of the present invention to provide a Real-time Emitter Locating System and Method. The preferred system should provide a technique for taking in data sets (lines of bearing) from DF receivers and characterizing those signals with their respective probabilities of error. Then using a unique method, the preferred system can apply a recursive processing technique to this continuous stream of data, displaying transmitter positions with significantly less uncertainty. Furthermore, the preferred system must be able to perform these functions in real-time. It is a further object that this system is capable of being fully automated which would reduce the processing time and reduce the necessity of human intervention. It is still even further an object that an alternative embodiment of the present invention is to feasibly remote control the system over a network and collect and combine the same information from several DF Sets. In this way, a far more efficient EL System can be achieved in which the emitter's position can be determined more quickly from a centralized command facility. This combination of data filtering and data collection techniques significantly reduces measurement uncertainties and enhances the accuracy of EL systems.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Real-time Emitter Locating System and Method.

Figure 1:
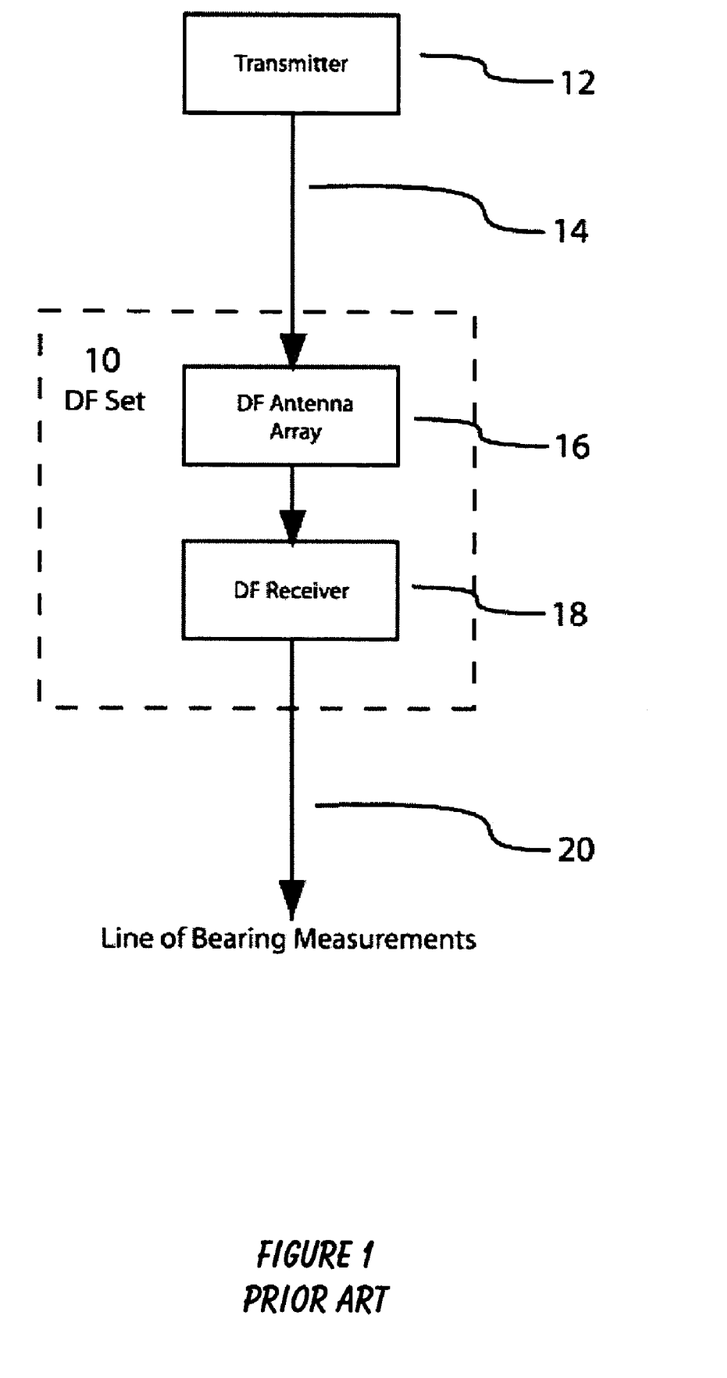
FIG. 1 is a drawing of a typical DF Set.

The present invention can best be understood by initial consideration of FIG. 1. FIG. 1 is a drawing of a typical DF Set 10. A DF Set 10 is comprised of a DF antenna 16 which is connected to a DF receiver 18. The DF receiver then outputs LOB data 20. The output LOB measurements are either raw data, or averaged data.

Figure 2:
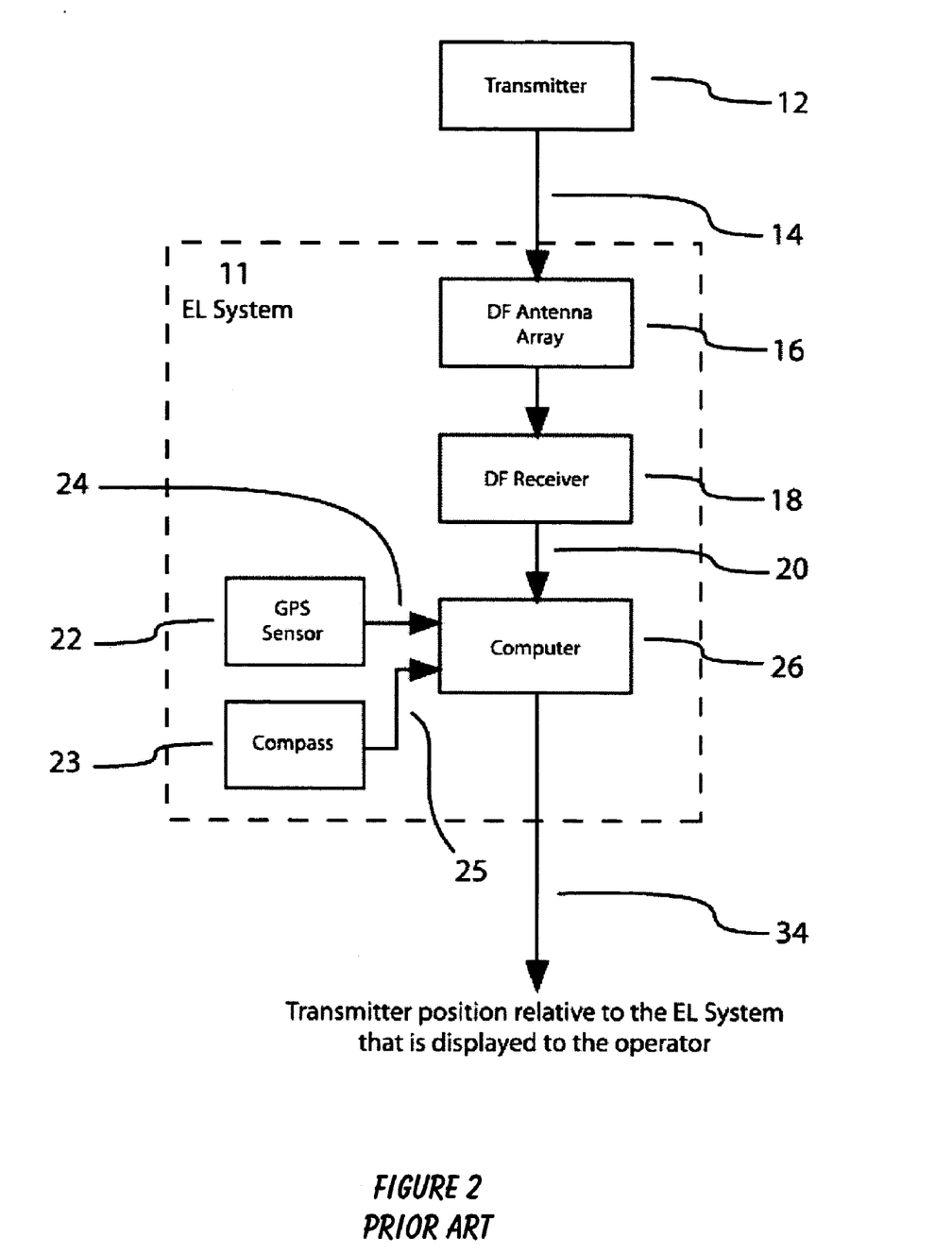
FIG. 2 is a drawing of the configuration of an EL System when employing the method of this invention.

FIG. 2 is a drawing of the configuration of an EL System when employing the method of this invention. A single DF Set has its output LOB's and quality number data sent to a computer which runs the method of this invention. Other data from a GPS sensor and a Compass are also used. An EL System is comprised of a DF Set which outputs its LOB data to a computer device 26. The computer also gets DF Set position data 24 from a positioning device 22 (which is often a GPS sensor), as well as DF Set orientation data 25 from a compass device 23.

The computer 26 provides the following functions for the EL System: (1) Algorithms on the LOB data sets to reduce measurement uncertainties; (2) DF receiver control; (3) Mapping and LOB histogram displays; (4) Antenna calibration tables; (5) Networking capabilities; and (6) Integrated triangulation functions with other mobile/fixed DF Sets.

It should be reiterated and understood that present-day DF Sets contain inherent errors in their measurements, which translates to errors in the reported positions of transmitters in EL Systems. Averaging of the DF Set LOB data sets provides a very marginal approach to error correction. In summary, the disadvantages with this prior system and process are that:

(a) it is still subject to constant inherent uncertainties;

(b) the averaging methods typically used require full matrix multiplications of the LOB data-sets, which slows the computing process of determining a result;

(c) the uncertainties in individual DF Set measurements further create errors in multiple DF Set triangulation calculations.

What is needed therefore in order to fully optimize these EL systems is (1) The enhanced ability to evaluate the measurement data 20 and reduce the overall uncertainties; and (2) An enhanced technique to collect the LOB data. These two things are described in this description.

Figure 3:
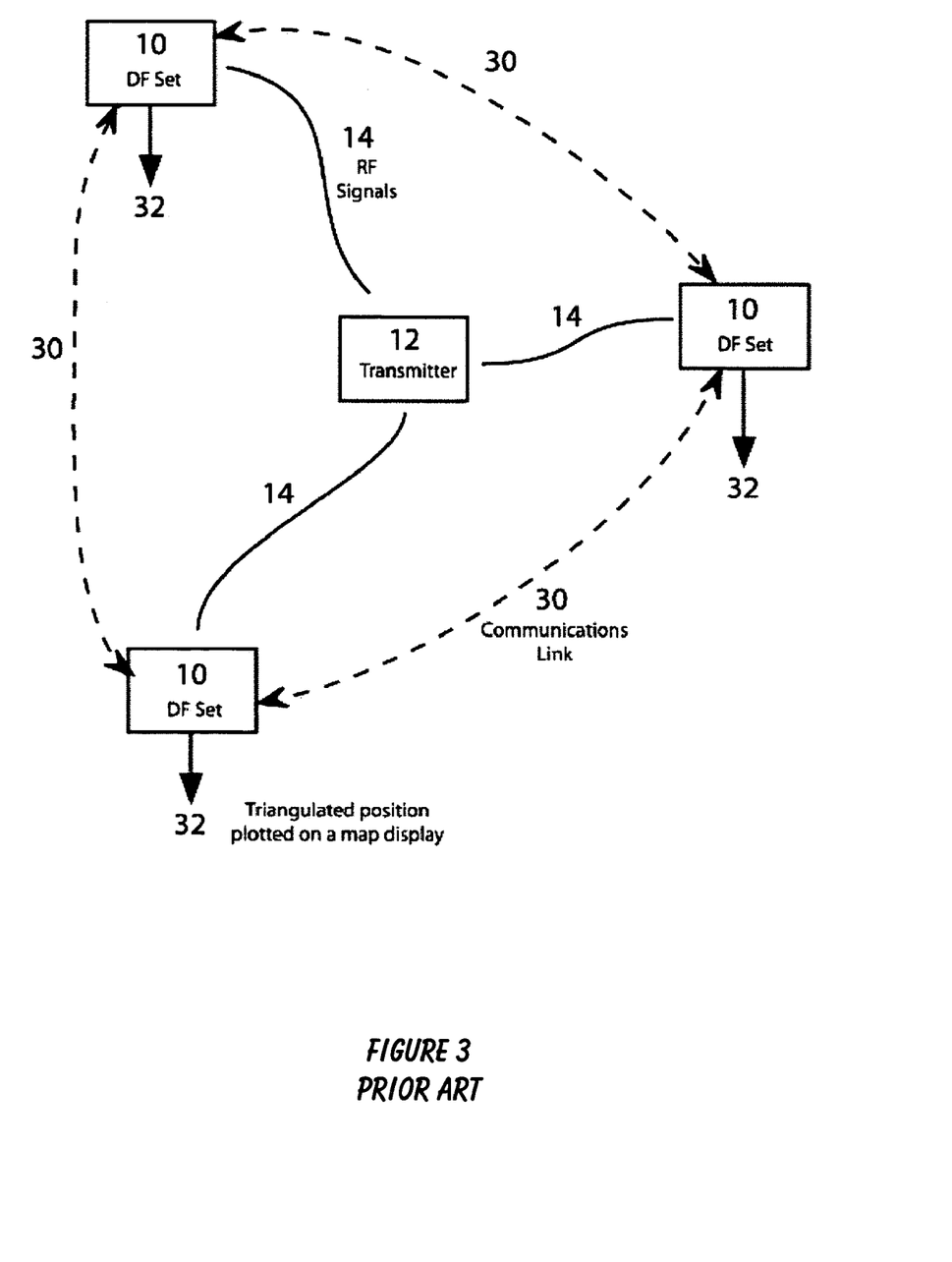
FIG. 3 is a drawing of how emitter locating is presently done today with three or more DF Sets.

FIG. 3 is a drawing of how emitter locating is presently done today with three or more DF Sets. The DF Sets are connected through a communications link so the LOB data from each DF Set is used to triangulate the position of the transmitter. The result is a transmitter's location that sometimes contains large uncertainties.

Figure 4:
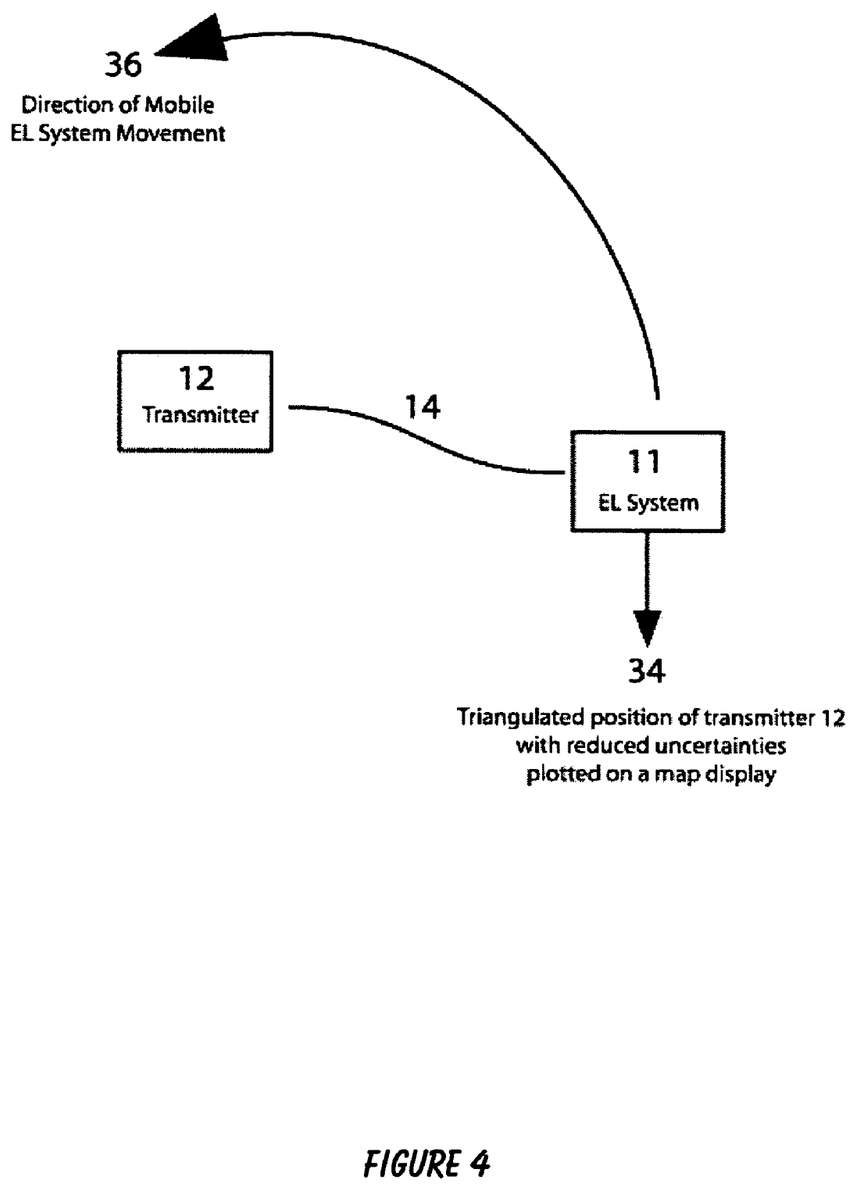
FIG. 4 is a drawing of the technique of this invention for collecting data.

FIG. 4 is a drawing of the technique of this invention for collecting data. In this case, at least one of the DF Sets is mobile. Only one is shown in FIG. 4, the mobile unit can be a part of a larger network of more DF Sets though. The transmitter's position is calculated much more accurately and in real-time with a combination of data-taking technique and the specialized method to handle the data streams. The result is a transmitter's location that contains reduced uncertainties and errors and is more accurate.

The technique of this invention involves the use of a mobile DF Set in a EL System. There may be one or multiple DF Sets used. The first step is for the mobile DF Set to take an LOB measurement of transmitter 12. This process involves taking the LOB data and the so-called "quality number" reading from the DF receiver. Modern DF receivers now produce a quality number with every LOB output. This quality number value is a metric by which the DF receiver manufacturer estimates the probability that a measurement is accurate. The computer 26 then takes this quality number along with the actual LOB measurement and stores them in memory for future processing.

The next step is for the mobile DF Set to move its physical position with respect to the transmitter's position. While moving, the DF Set is constantly taking in more LOB data and associated quality numbers. This process goes on for as long as required to find the transmitter. The more data that is collected, the higher will be the probability that the triangulated position of the transmitter is where it is expected to be.

This invention employs a specialized recursive method in the computer to process the LOB data that is continually being stored. The whole process begins after a "cross-over" point is first found. A cross-over point is the intersection between the last best LOB data entry, and the newly arrived LOB; typically a point where two LOB's cross (a position having a fairly high confidence level).

This cross-over point, when fixed on a map, is the original triangulated position (hereafter referred to as the "position point") of the transmitter.

Next, a new LOB is measured and taken into account. The method calculates the shortest distance between the last best position point, and the newly arrived LOB. This will be a perpendicular vector from the point to the line-of-bearing. The method then calculates a new best guess position point along this vector, taking into account the new LOB's associated quality number as a weighting. Again, this calculation can be done in real time since the method is recursive, and therefore does not require the recomputing of every single LOB data entry taken up to that point.

In essence, the method uses a form of feedback control with an expected outcome. This recursive process is the basis of the method's uniqueness when applied to reducing measurement uncertainties in EL Systems. The measurement update steps of the method are responsible for incorporating every new measurement into the a priori estimate to obtain an improved a posteriori estimate.

LOB measurements that have a low quality number will be given less weight in the method when calculating the position points. LOB measurements that have a high quality number will be given much more weight in the same method. The method then outputs the "adjusted" output accordingly given the continuous stream of data points. This process will in effect prioritize the higher probability measurements designated by the quality number. Thus, the computer displays to the EL operator a much more accurate fix to the transmitter than can be achieved by simple averaging means of the entire data sets. The method of this invention is a form of statistical filtering.

This method has the ability to do real-time processing. Simple averaging of values requires more multiplications, thus the old method of averaging is slower and not able to be used in real-time if a large amount of data is used. The newer method of this provisional patent application uses fewer multiplications and thus can be performed by any standard processor and computer. To reiterate, the method's recursive nature thus makes practical implementations much more feasible than simple averaging, which is designed to operate on all of the data directly for each estimate. This is a unique and distinguishing advantage of the invention when used in EL Systems.

It is worthy of note that the spreading of position points across an integrated map display gives essentially the size of a "probability field" where the transmitter is most likely to be located. As more position points are calculated that deviate from each other, the probability field can be shown to grow on a map display. Such a display is the topic of another invention described in a provisional patent application entitled: "Technique and Method for Displaying Probabilistic Locations of Transmitters in Emitter Location Systems" that is the subject of pending patent application Ser. No. 10/785,356.

Figure 5:
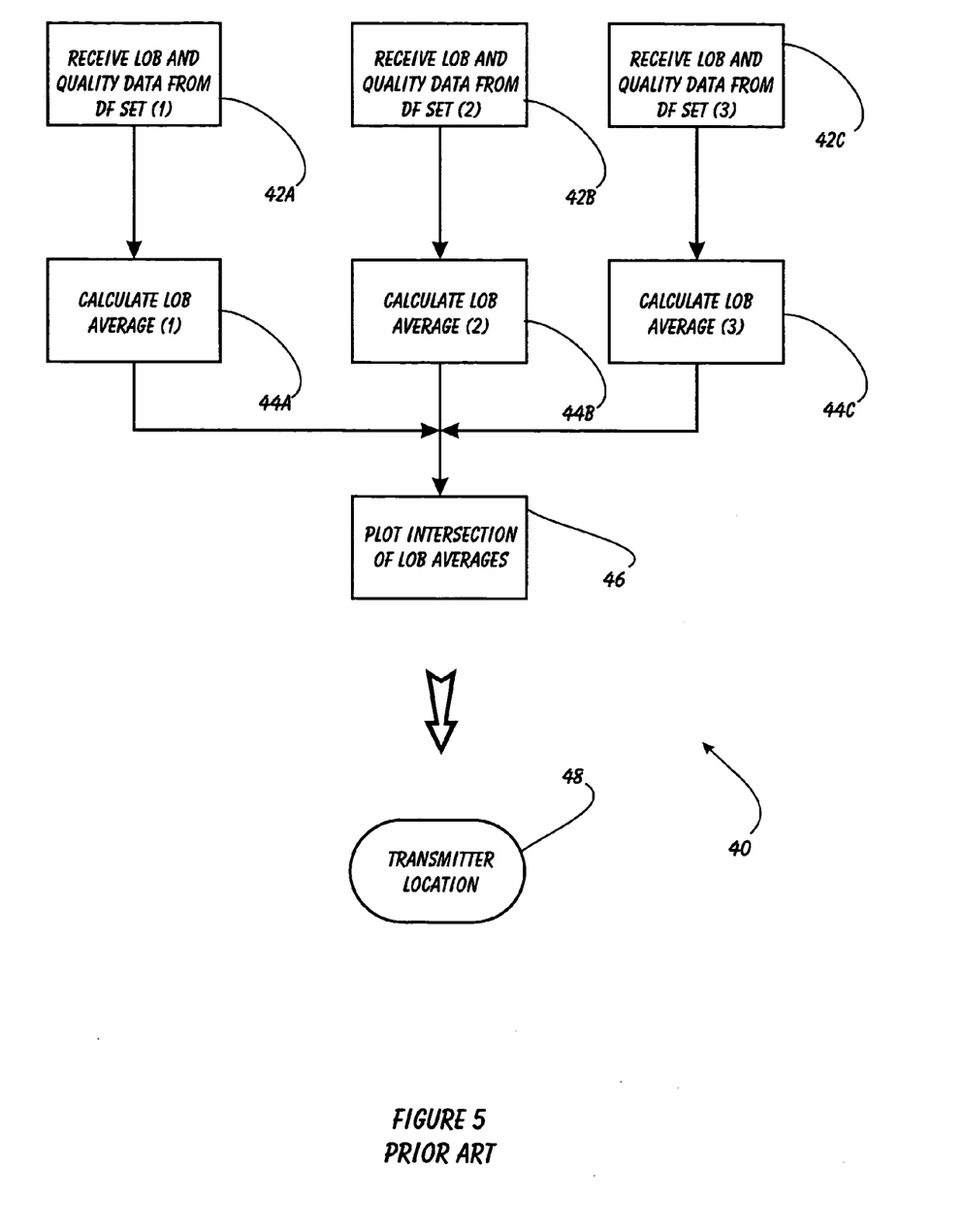
FIG. 5 is a flow chart depicting the prior art DF method for locating a transmitter.
Figure 6A:
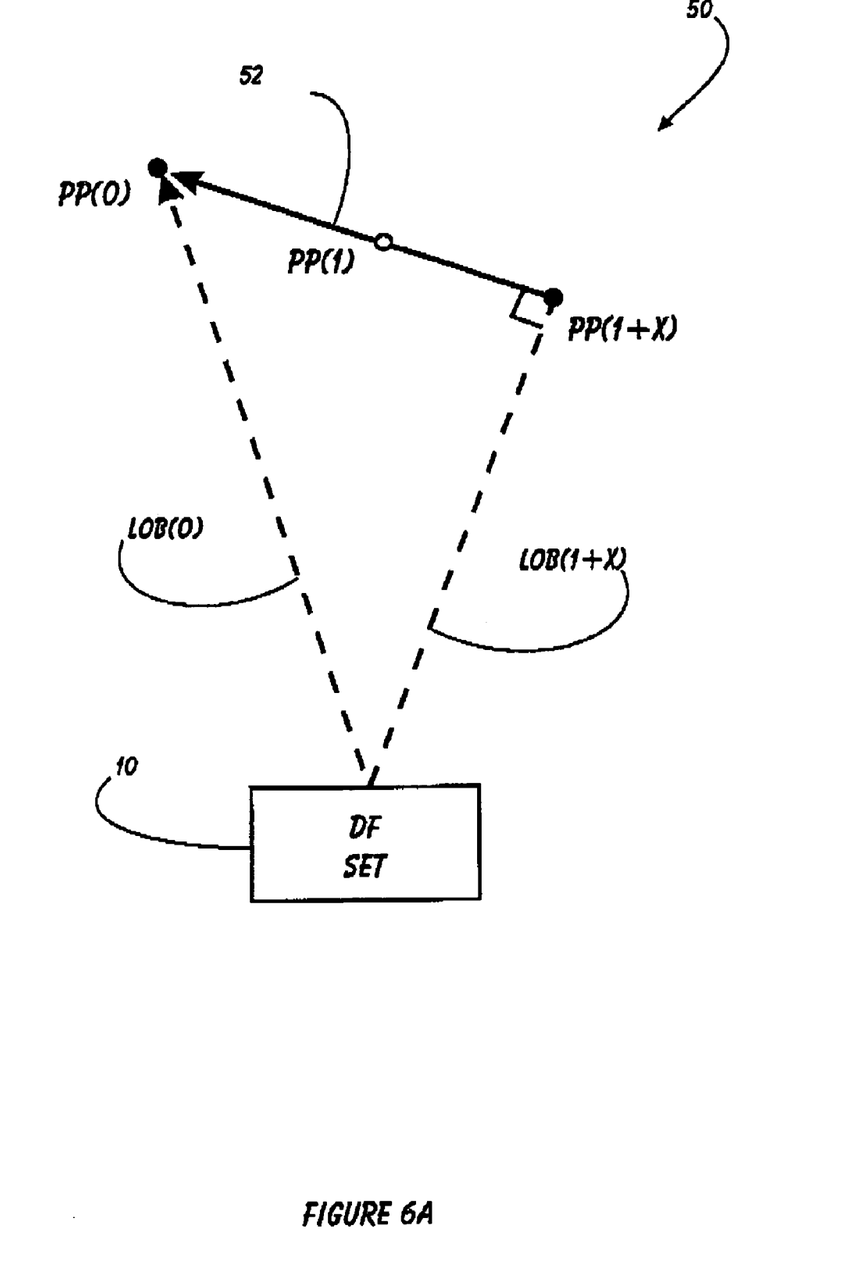
FIGS. 6A and 6B depicts the graphical approach employed by the present invention to determine a transmitter's position point.

FIG. 5 is a flow chart depicting the prior art DF method for locating a transmitter. As shown, the EL system receives a stream of Line of Bearing and Quality information from at least three DF sets 42A, 42B and 42C; three DF sets is generally the minimum necessary in order to achieve triangulation. Next, the EL system calculates the average Line of Bearing from a particular segment of each DF set 44A, 44B and 44C. These averaged Lines of Bearing from each DF set to the transmitter are then plotted 46 to result in a conclusion by the EL system as to the transmitter's location 48. As discussed above, the target problems to be resolved by the present invention is the delay in arriving at the average Line of Bearing for each DF set, the lack of control and understanding of the inherent error in each of the LOB averages, and also the need for three or more active and high-quality DF set LOB signals in order to arrive at any sort of reliable transmitter position. FIG. 6A shows the fundamentals of how the present approach operates.

FIG. 6A depicts the DF set at two subsequent locations. For the purpose of clarifying the geometry of the locating solution method, however, the DF set is shown as stationary (relative to the transmitter location graphical solution). As a result, FIG. 6A can be considered to be a DF Set-centric view, wherein the DF set appears to be stationary and any lines of bearing or transmitter locations are in relation (or relative to) the moving DF set. In fact, the transmitter might actually be stationary in the depicted FIG. 6, with all relative movement being provided by the transmitter. First, PP(0) (the cross-over point) is determined as discussed in the Specification previously. As the DF Set is then moved, the line of bearing to the cross-over point will continue to "point" towards PP(0). When a new DF Set location is reached and a new line of bearing is "drawn" to the newly-detected transmission. The connecting vector, in this example, is then drawn perpendicular to the latest line of bearing, through the last line of bearing or estimate position (in this case it is PP(0)).

Figure 6B:
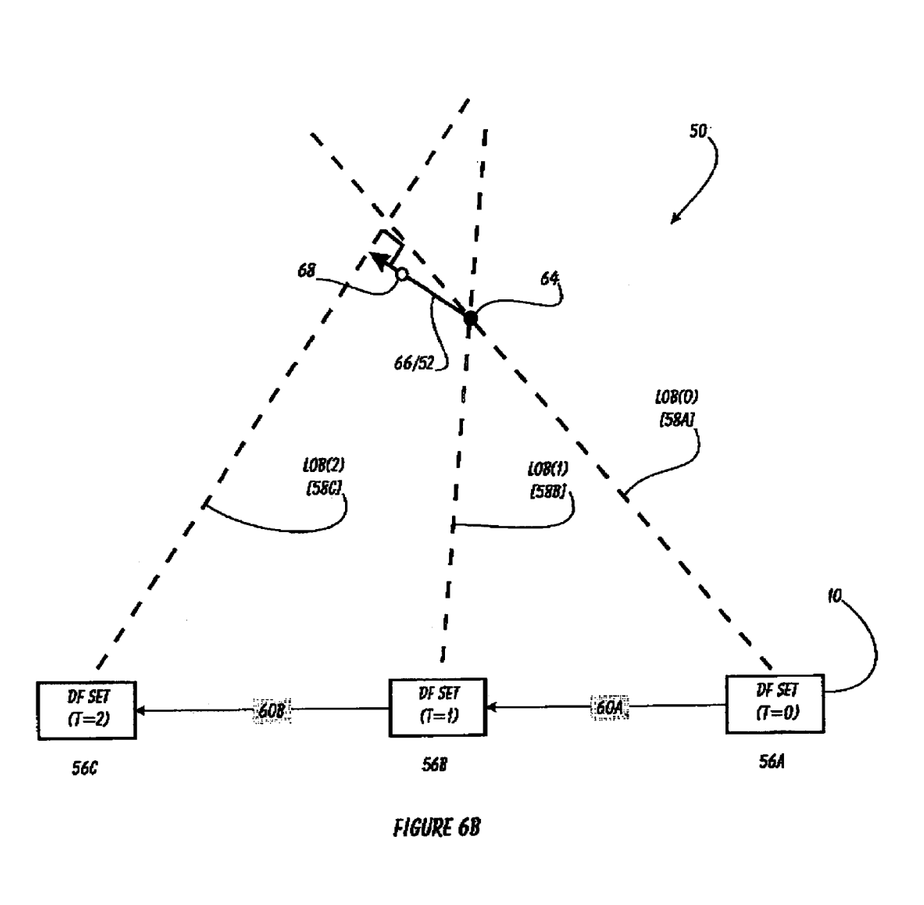

FIG. 6B graphically depicts the method of the present invention (as specifically described below in connection with the description associated with FIG. 7), from an "Earth-centric" or reference frame fixed in relation to the earth.

Next, the EL system obtains another Line of Bearing (LOB(1)) to the transmitter (PP(1)), and constructs a connecting vector 52 that is perpendicular to the current line of bearing (LOB(1)), and ends at the last line of bearing (in this case, PP(0), the cross-over point). This method assumes that the higher the quality number associated with LOB(1), the higher the probability that PP(1) actually lies on the connecting vector 52. This process is repeated, and more LOB's are obtained, until such time as the EL system determines a high probability of the location of the transmitter.

FIG 6 depicts the DF set at two subsequent locations. For the purpose of clarifying the geometry of the locating solution method, however, the DF set is shown as stationary (relative to the transmitter location graphical solution). As a result, FIG. 6 can be considered to be a DE Set-centric view, wherein the DF set appears to be stationary and any lines of bearing or transmitter locations are in relation (or relative to) the moving DF set. In fact, the transmitter might actually be stationary in the depicted FIG. 6, with all relative movement being provided by the transmitter. First, PP(0) (the cross-over point) is determined as discussed in the Specification previously. As the DF Set is then moved, the line of bearing to the cross-over point will continue to "point" towards PP(0). When a new DE Set location is reached and a new line of bearing is "drawn" to the newly-detected transmission. The connecting vector, in this example, is then drawn perpendicular to the latest line of bearing, through the last line of bearing or estimate position (in this case it is PP(0)).

Three things should be noted: (1) in order to be most effective, the DF set 10 must be exhibit motion relative to the transmitter, so that the LOB's will change somewhat as more and more readings are taken; (2) there is no need for three or even two DF sets in order to determine a "fix" or actual position for the transmitter with this method; and (3) all position determinations are made "on the fly," in real-time. Turning to FIG. 7, we can see how the entire method of the present invention executes.

Figure 7:
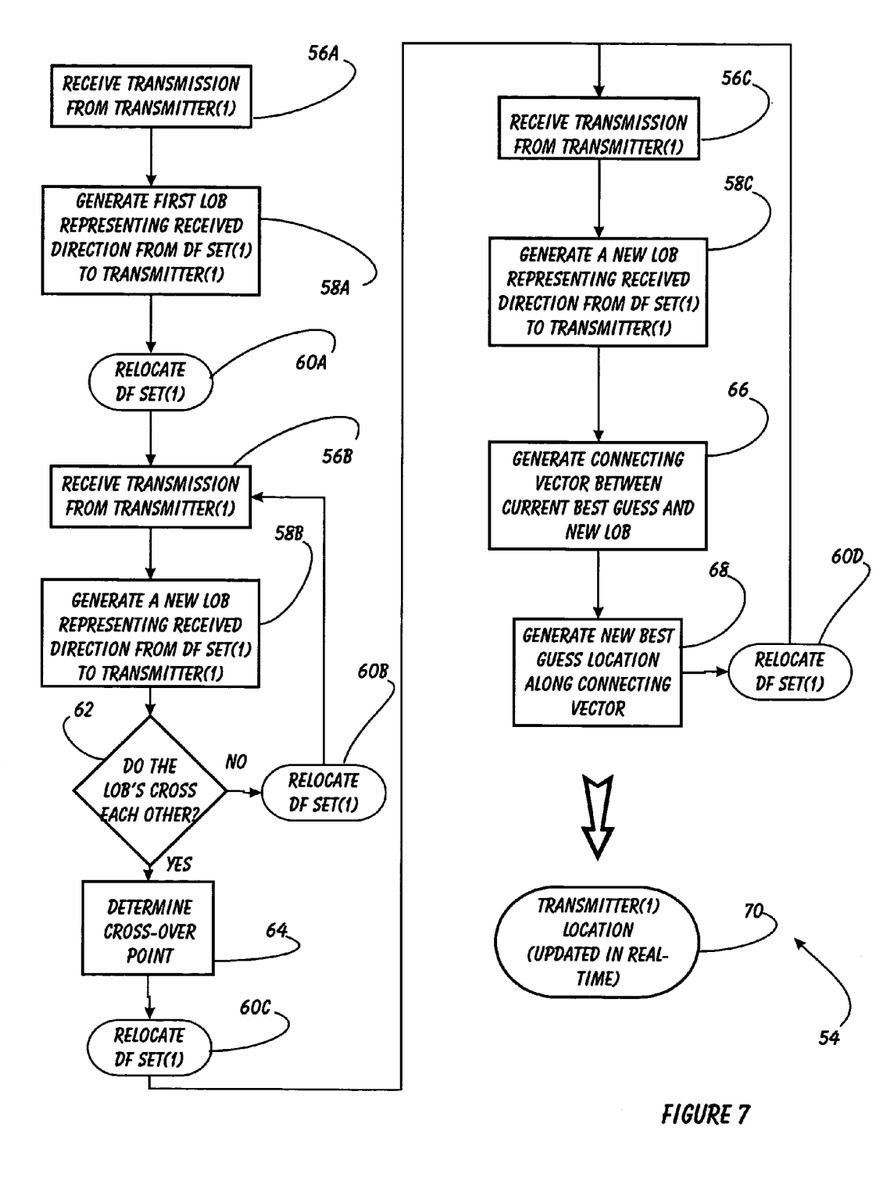
FIG. 7 is a flow chart depicting the real-time DF method for locating a transmitter of the present invention.

FIG. 7 is a flow chart depicting the real-time DF method 54 for locating a transmitter of the present invention.

First, the EL system receives at least one transmission from a transmitter 56A. The system will next generate a first Line of Bearing that represents the received transmission from transmitter(1) 58A. Next, the DF set is relocated 60A (preferably relative to transmitter(1)). Another transmission is received from transmitter(1) 56B, and a new Line of Bearing is generated 58B representing the direction that transmitter(1) was from DF set(1) when the transmission was received. The LOB's are then analyzed to determine whether or not they cross one another 62. If they do not, then the implication is that one or both have so much error in them that it would not be advisable to use their data. In this case, DF set(1) is relocated again 60B, and another transmission is received and LOB generated, until such time as when two sequential LOB's do cross one another. When two LOB's cross, a cross-over point in identified 64 at the spacial location of the crossing of the LOB's—this is the first "Best Guess" at the location of transmitter(1). It should be noted that the operator can simply select a cross-over point manually, in order to expedite the process—while this will effect the initial accuracy of the position locating process, as more sample data is taken, even this error will be resolved.

Once the cross-over point has been determined 64, DF set(1) is relocated again 60C, and another transmission is received from transmitter(1) 56C. Another LOB is generated 58C representing the direction to transmitter(1) from DF set(1). At this stage, a "connecting vector" (see FIG. 6) is generated from the last "Best Guess" location to the latest LOB 66. Next, a "New Best Guess" location is generated along the connecting vector, with its proximity to the last best guess being determined by the quality number of the latest transmission (and LOB), weighed against the weight of the last best guess (which is a factor of sample size and quality of the data that led to the last best guess's location).

The New Best Guess location will be identified for the user as transmitter(1)'s location 70, updated in real-time (unlike the prior systems). The system 54 then continues to relocate the DF set 60D and receive transmissions in order to continue to determine the location of transmitter(1).

It should be understood that no matter how bad the transmission data and resultant LOB's are, it will not impact the system's ability to provide a transmitter location to the user, since the "best guess" approach described herein is resilient to erroneous and/or random data.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

DIAGRAM REFERENCE NUMERALS

10 DF Set
11 EL System
12 Transmitter (Emitter)
14 RF signals
16 DF antenna array
18 DF receiver
20 Line-Of-Bearing (LOB) measurement data and quality number
22 GPS device
23 Compass device
24 DF Set Position data
25 DF Set Orientation data
26 Computer
30 Communications link
32 Triangulated position data plotted on a map display
34 Triangulated position data that has reduced uncertainties, plotted on a map
36 Direction movement vector of mobile DF Set in an EL System
42 Conventional LOB receipt steps
44 Conventional LOB average calculation steps
46 Conventional LOB intersection plotting step
48 Conventional transmitter location determination step
50 and 54 Real-time DF determination method
56–70 steps incorporated into the method of the present invention

What is claimed is:

1. A direction-finding method comprising the steps of:
establishing a cross-over position point;
relocating a receiver to a new receiver spacial location;
said receiver at said new receiver position receiving a transmission from a transmitter at a transmitter position;
determining a real-time line of bearing from said receiver to said transmitter;
generating a connecting vector from said real-time line of bearing to said cross-over position point; and
identifying a real-time position of said transmitter along said connecting vector.

2. The method of claim 1, wherein said identifying comprises identifying a best guess transmitter position responsive to said real-time position of said transmitter.

3. The method of claim 2, further comprising the steps of:
again relocating said receiver to a new receiver spacial location;
said receiver at said new receiver position receiving a transmission from said transmitter at a transmitter position;
determining another said real-time line of bearing from said receiver to said transmitter;
generating a said connecting vector from said last real-time line of bearing to said best guess transmitter position; and
identifying said best guess position of said transmitter along said connecting vector.

4. The method of claim 3, wherein:
said determining step further comprises determining a quality factor for said real-time line of bearing; and
said identifying step further comprises assigning a probability factor to said real-time position of said transmitter responsive to said quality factor.

5. The method of claim 3, further comprising a repeating step to repeat said relocating, receiving, determining, generating and identifying steps until said probability factor exceeds a predetermined threshold value.

6. The method of claim 3, further comprising a repeating step to repeat said relocating, receiving, determining, generating and identifying steps until a user terminates said direction finding method.

7. The method of claim 3, further comprising a repeating step to repeat said relocating, receiving, determining, generating and identifying steps until said probability factor meets a user-defined threshold value.

8. A direction-finding method executed by a portable DF set comprising a receiver and a programmable computing system comprising a processors, an input device, an output device and a storage medium, the method comprising the steps of:
establishing a cross-over position point representing a position of a transmitter and outputting said point at said output device;
moving said DF set to a new DF set position;
receiving at said DF set in said new DF set position, a transmission from said transmitter;
determining, via said programmable computer, a real-time line of bearing from said DF set to said transmitter responsive to said transmission;
generating, via said programmable computer, a connecting vector from said real-time line of bearing to said cross-over position point; and
determining a real-time transmitter position along said connecting vector and outputting said position at said output device.

9. The method of claim 8, wherein said identifying comprises identifying a best guess transmitter position responsive to said real-time position of said transmitter.

10. The method of claim 9, further comprising the steps of:
again relocating said receiver to a new receiver spacial location;
said receiver at said new receiver position receiving a transmission from said transmitter at a transmitter position;
determining another said real-time line of bearing from said receiver to said transmitter;
generating a said connecting vector from said last real-time line of beating to said best guess transmitter position; and
identifying said best guess position of said transmitter along said connecting vector.

11. The method of claim 10, wherein:
said determining step further comprises determining a quality factor for said real-time line of bearing; and
said identifying step further comprises assigning a probability factor to said real-time position of said transmitter responsive to said quality factor.

12. The method of claim 10, further comprising a repeating step to repeat said relocating, receiving, determining, generating and identifying stops until said probability factor exceeds a predetermined threshold value.

13. The method of claim 10, further comprising a repeating step to repeat said relocating, receiving, determining, generating and identifying steps until a user terminates said direction finding method.

14. The method of claim 10, further comprising a repeating step to repeat said relocating, receiving, determining, generating and identifying steps until said probability factor meets a user-defined threshold value.

15. A real-time direction-finding system, comprising:
a transmitter transmitting wireless transmissions, said transmitter defining a spatial location;
a DF set comprising a movable receiver for receiving said transmissions; and
a computing device for determining said location of said transmitter responsive to transmissions received by said movable receiver and not responsive to other said receivers, wherein said computing device operatively:
generates a cross-over point, said cross-over point defined as the intersection of a pair of sequential real-time lines of bearing from said DF set each line of bearing corresponding to a wireless transmission from said transmitter received by said DF set;
receives a transmission signal responsive to a transmission received by said DF set after said DF set has been moved to a new spatial location;
determines a real-time line of bearing from said DF set to said transmitter responsive to said transmission signal;
generates a connecting vector from said real-time line of bearing; and
determines a real-time transmitter position along said connecting vector and outputting said position at an output device associated with said computing device.

* * * * *